United States Patent
Kim

(10) Patent No.: US 8,600,379 B2
(45) Date of Patent: Dec. 3, 2013

(54) APPARATUS AND METHOD FOR IMPROVING QUALITY OF SERVICE IN WIRELESS COMMUNICATION SYSTEM

(75) Inventor: Jong-Chul Kim, Suwon-si (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 729 days.

(21) Appl. No.: 12/732,488

(22) Filed: Mar. 26, 2010

(65) Prior Publication Data
US 2010/0248718 A1     Sep. 30, 2010

(30) Foreign Application Priority Data
Mar. 26, 2009  (KR) .................. 10-2009-0026097

(51) Int. Cl.
*H04W 24/10*    (2009.01)

(52) U.S. Cl.
USPC ........... 455/434; 455/574; 455/522; 370/329; 370/328

(58) Field of Classification Search
USPC ............. 455/436, 574, 434, 522, 343.1, 41.2, 455/515, 450; 484/436, 574; 370/329, 328, 370/331, 311, 338, 348; 709/226, 221
See application file for complete search history.

(56) References Cited

U.S. PATENT DOCUMENTS

| | | | |
|---|---|---|---|
| 5,541,929 A * | 7/1996 | Jokura | 370/337 |
| 2004/0198308 A1* | 10/2004 | Hurst et al. | 455/403 |
| 2004/0223483 A1* | 11/2004 | Cooper | 370/347 |
| 2005/0197171 A1* | 9/2005 | Son et al. | 455/574 |
| 2006/0182077 A1* | 8/2006 | Scherzer et al. | 370/338 |
| 2007/0242647 A1* | 10/2007 | Bennett | 370/338 |
| 2009/0088160 A1* | 4/2009 | Pani et al. | 455/436 |

* cited by examiner

*Primary Examiner* — Mahendra Patel
(74) *Attorney, Agent, or Firm* — Cha & Reiter, LLC

(57) ABSTRACT

An apparatus and a method for scanning neighbor networks in a mobile terminal are provided. In the method, the strength of a signal received from a serving station is measured. Whether to scan at least one neighbor network is determined with consideration of the strength of the signal. When it is determined to scan at least one neighbor network, the terminal switches to a power save mode, an at least one channel of the at least one neighbor network is scanned during an operation of the power save mode.

16 Claims, 5 Drawing Sheets

APPARATUS AND METHOD FOR IMPROVING QUALITY OF SERVICE IN WIRELESS COMMUNICATION SYSTEM

CLAIM OF PRIORITY

This application claims the benefit of a Korean patent application filed in the Korean Intellectual Property Office on Mar. 26, 2009 and assigned Serial No. 10-2009-0026097, the entire disclosure of which is hereby incorporated by reference.

BACKGROUND OF THE INVENTION

1. Field of the Invention

The present invention relates to an apparatus and a method for improving Quality of Service (QoS) in a wireless communication system. More particularly, the present invention relates improving QoS of data communication in a wireless communication system.

2. Description of the Related Art

In the case of providing a seamless communication service in a wireless Local Area Network (LAN), a wireless communication system provides a roaming service in order to guarantee mobility of a terminal. In operation, the terminal searches for a neighbor network through scanning in order to perform roaming.

In the case of scanning a neighbor network, the terminal determines a channel status associated with a neighbor network using signals received from neighbor networks. And, the terminal does not perform communication with a serving network while scanning the neighbor networks.

Accordingly, a packet is lost due to disconnection of communication with the serving network during scanning mode.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for reducing a packet loss caused by scanning of neighbor networks in a wireless communication system.

Another aspect of the present invention is to provide an apparatus and a method for reducing a packet loss caused by scanning of neighbor networks by scanning the neighbor networks during a power save mode.

Still another aspect of the present invention is to provide an apparatus and a method for switching to a power save mode in order to scan neighbor networks in a terminal of a wireless communication system.

Yet another aspect of the present invention is to provide an apparatus and a method for scanning some of all channels during a power save mode in a terminal of a wireless communication system.

In accordance with an aspect of the present invention, a method for scanning neighbor networks in a mobile terminal is provided. The method includes measuring strength of a signal received from a serving station, determining whether to scan at least one neighbor network with consideration of the strength of the signal, switching to a power save mode; and scanning at least one channel of the at least one neighbor network during an operation of the power save mode.

In accordance with another aspect of the present invention, an apparatus for scanning neighbor networks in a mobile terminal is provided. The apparatus includes a receiver for receiving a signal; a signal strength measuring unit for measuring strength of the signal received via the receiver, and a controller for determining whether to scan at least one neighbor network with consideration of the strength of the signal, switching to a power save mode, and controlling to scan at least one channel of the at least one neighbor network during the power save mode.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above features and advantages of certain exemplary embodiments of the present invention will be more apparent to those skilled in the art from the following description taken in conjunction with the accompanying drawings in which.

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. For the purpose of simplicity, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Exemplary embodiments of the present invention provide a technique for reducing QoS deterioration and a packet loss caused by scanning of neighbor networks by a terminal in a wireless communication system.

Figure 1:
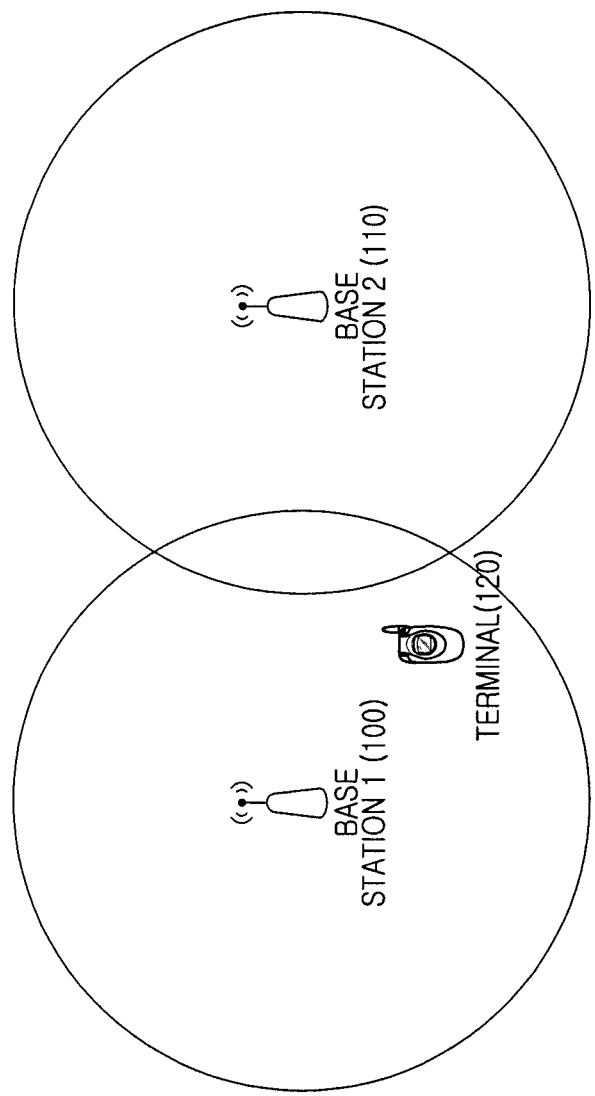
FIG. 1 is a view illustrating a wireless communication system according to an exemplary embodiment of the present invention.

FIG. 1 is a view illustrating a wireless communication system according to an exemplary embodiment of the present invention.

Referring to FIG. 1, the wireless communication system includes a base station 1 (100), a base station 2 (110), and a terminal 120. Here, since the base station 1 (100) and the base station 2 (110) provide a wireless LAN service, both stations serve as Access Points (APs).

The terminal 120 is located in a service area of the base station 1 (100) and receives a service from the base station 1 (100).

When the terminal 120 moves to another service area or network covered by the base station 2 (110), the terminal 120 accesses the base station 2 (110) through roaming. Here, while connected to the base station 1 (100), the terminal 120 searches for the base station 2 (110) in order to scan and roam over neighbor networks. After that, the terminal 120 accesses the base station 2 (110) through roaming.

As described above, the terminal 120 searches for the base station 2 (110) for roaming by scanning neighbor networks. In particular, the terminal 120 scans neighbor networks during a power save mode as illustrated in FIG. 2.

Figure 2:
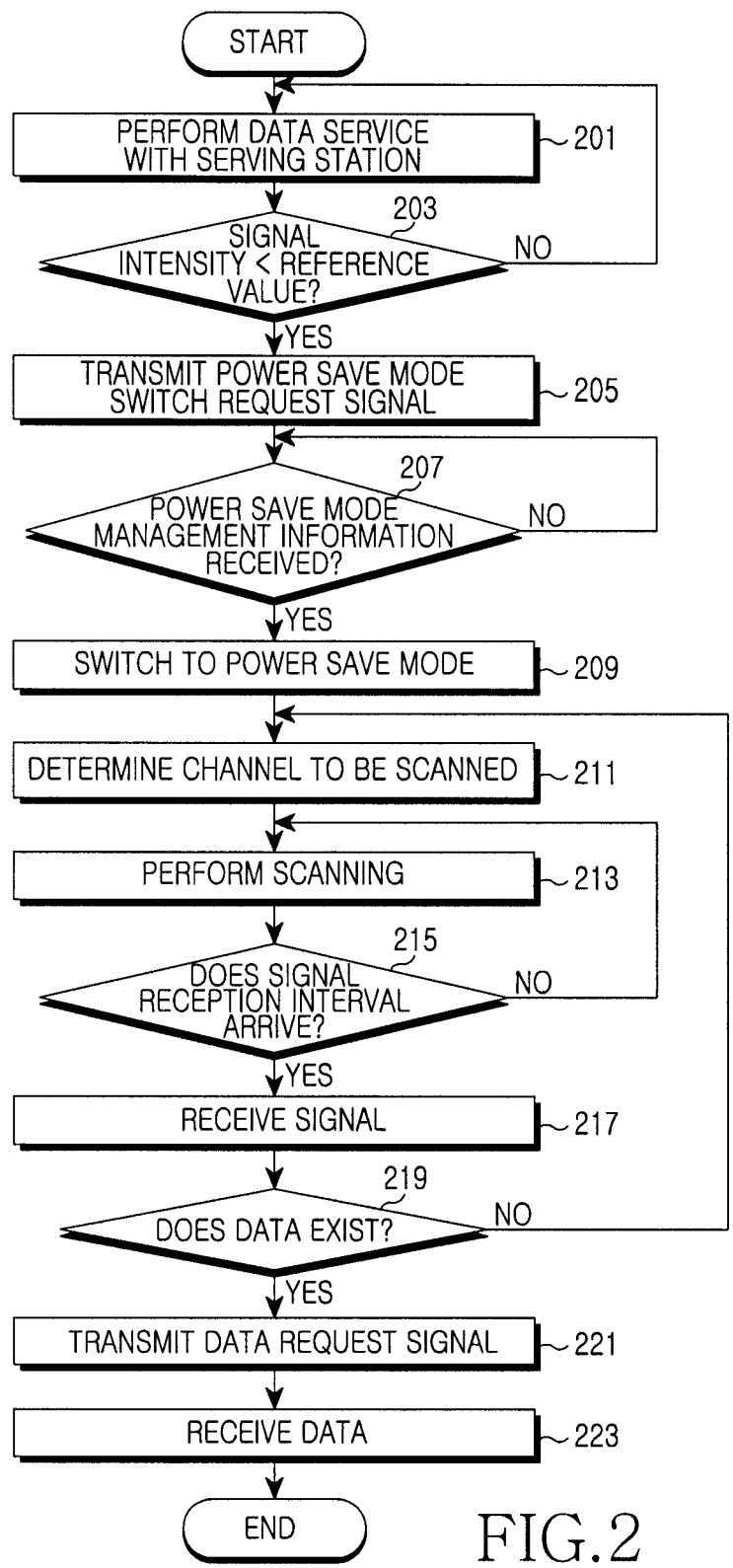
FIG. 2 is a flowchart illustrating a procedure for allowing a terminal to perform scanning according to an exemplary embodiment of the present invention.

FIG. 2 is a flowchart illustrating a procedure for allowing a terminal to perform scanning according to an exemplary embodiment of the present invention.

Referring to FIG. 2, the terminal performs a data service with a serving station in step 201. For example, the terminal transmits/receives data to/from an AP that the terminal has an access to.

During a data service with the serving station, the terminal compares strength of a signal received from the serving station with a reference value in step 203.

When the strength of the signal received from the serving station is equal to or greater than the reference value, the terminal returns to step 201 and maintains the data service with the serving station.

In contrast, when the strength of the signal received from the serving station is less than the reference value, the terminal transmits a power save mode switch request signal to the serving station in step 205.

Thereafter, the terminal determines whether power save mode management information is received from the serving station in step 207. For example, the power save mode management information includes a point at which the terminal switches to a power save mode, and period information at which a terminal that operates in the power save mode receives a beacon signal. Here, the beacon signal includes information as to whether data to be received by the terminal exists.

When the power save mode management information is received, the terminal switches an operation mode into the power save mode according to the power save mode management information in step 209.

After switching to the power save mode, the terminal determines a channel to be scanned in step 211. For example, the terminal scans channels of neighbor networks while operating in the power save mode. Accordingly, in the case where a beacon period of the terminal is 100 ms, the terminal divides all channels to be scanned into at least one channel group to be scanned for 100 ms. After that, the terminal determines channels to be scanned from the at least one channel group in step 211.

After determining the channels to be scanned, the terminal scans channels of the channel group determined (in step 211) in step 213. That is, the terminal scans the determined channels of neighbor networks the power save mode. For example, the terminal transmits a probe request signal to a network. the terminal determines status information of the network using a probe response signal provided from the network Herein, the status information includes strength of the probe response signal.

The terminal determines whether a beacon period for receiving a beacon signal arrives in step 215.

When the beacon period does not arrive, the terminal returns to step 213 and scans channels.

In contrast, when the beacon period arrives, the terminal receives a beacon signal from the serving station in step 217.

The terminal determines whether data to be received from the serving station exists using the received beacon signal in step 219.

When data to be received from the serving station does not exist, the terminal returns to step 211 and determines channels to be scanned. At this point, the terminal determines a channel that has not been scanned using channel division information. For example, in the case of having performed scanning up to an i-th channel group, the terminal determines a channel included in an (i+1)-th channel group.

In contrast, when data to be received from the serving station exists, the terminal transmits a data request signal to the serving station in step 221. For example, the terminal transmits a Power Save (PS)-poll packet to the serving station in order to request data.

After transmitting a data request signal to the serving station, the terminal receives data from the serving station in step 223. After that, the terminal ends the present algorithm.

In the above embodiment, when a signal strength from the serving station is less than the reference value, the terminal transmits a power save mode switch request signal to the serving station.

Thereafter, the terminal divides all channels to be scanned into at least one channel set, and scans the channels for each channel set. At this point, the terminal may divide a channel set such that the terminal scans the same channel as that of the serving station first, or may divide a channel set according to a cell plan. For example, in the case where of allocating a channel 1 to the base station 1 (100) and allocating a channel 5 to the base station 2 (110) in FIG. 1 with consideration of a neighbor cell interference, the terminal 120 may divide a channel set such that the terminal scans the channel 1 first and then scans the channel 5. At this point, the terminal may scan a channel set including the same channel as that of the serving station first.

Figure 3:
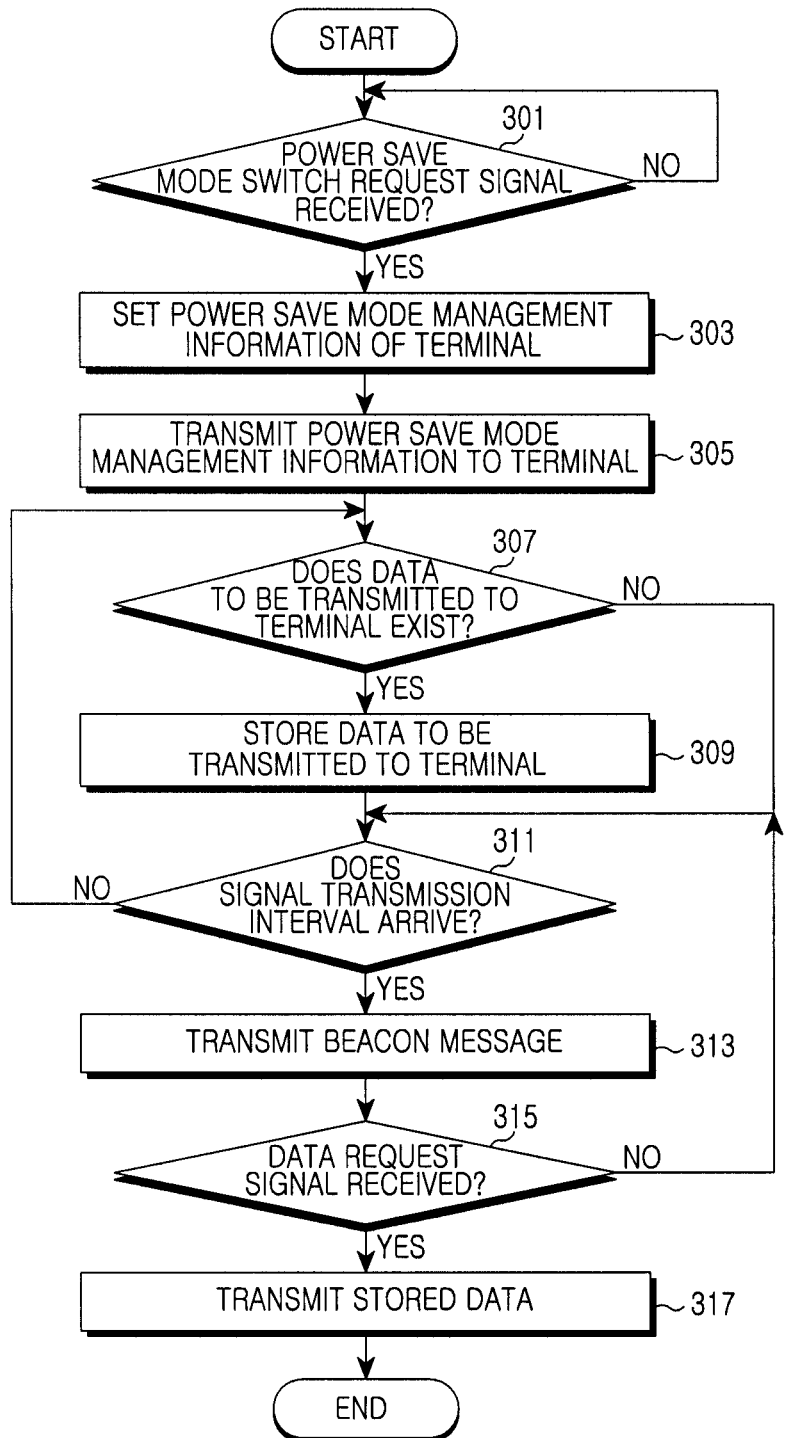
FIG. 3 is a flowchart illustrating a procedure for allowing a base station to control a power save mode of a terminal according to an exemplary embodiment of the present invention.

As described above, in the case where the terminal switches to a power save mode in order to scan a neighbor network, a base station controls a power save mode of the terminal as illustrated in FIG. 3.

FIG. 3 is a flowchart illustrating a procedure for allowing a base station to control a power save mode of a terminal according to an exemplary embodiment of the present invention.

Referring to FIG. 3, the base station determines whether a power save mode switch request signal is received from a terminal to which a service is provided in step 301.

When the power save mode switch request signal is received from the terminal, the base station sets power save mode management information for the terminal in step 303. For example, the power save mode management information includes a point at which the terminal switches to the power save mode, and period information at which the terminal that operates in the power save mode receives a beacon signal. Here, the beacon signal includes information as to whether data to be transmitted to the terminal that operates in the power save mode exists.

After setting the power save mode management information for the terminal, the base station transmits the set power save mode management information to the terminal in step 305.

The base station determines whether data to be transmitted to the terminal exists in step 307. That is, the base station determines whether data to be transmitted to the terminal that has switched to the power save mode exists using the power save mode management information.

When the data to be transmitted to the terminal does not exist, the base station determines whether a beacon signal transmission period for the terminal arrives in step 311.

In contrast, when the data to be transmitted to the terminal exists, the base station temporarily stores the data to be transmitted to the terminal in step 309.

The base station determines whether a beacon signal transmission period for the terminal arrives in step 311.

When the beacon signal transmission period for the terminal does not arrive, the base station returns to step 307 and determines whether data to be transmitted to the terminal exists.

In contrast, when the beacon signal transmission period for the terminal arrives, the base station transmits a beacon signal to the terminal in step 313. For example, when temporarily storing data to be transmitted to the terminal, the base station transmits a beacon signal including existence information of the data to be transmitted to the terminal, to the terminal.

The base station determines whether a data request signal is received from the terminal in step 315.

When a data request signal is not received from the terminal for a predetermined time period, the base station returns to step 311 and determines whether a beacon signal transmission period for the terminal arrives.

In contrast, when the data request signal is received from the terminal, the base station transmits the data temporarily stored in step 309 to the terminal in step 317.

After that, the base station ends the present algorithm.

Hereinafter, a construction of a terminal for scanning neighbor networks during a power save mode is described.

Figure 4:
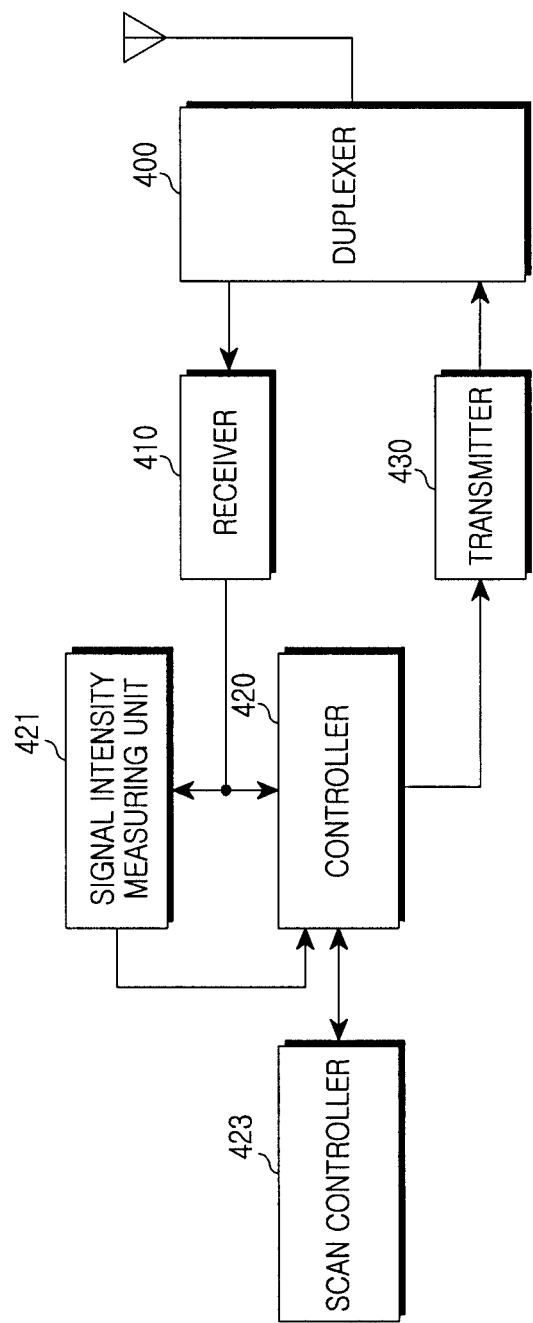
FIG. 4 is a block diagram illustrating a terminal for performing scanning according to an exemplary embodiment of the present invention.

FIG. 4 is a block diagram illustrating a terminal for performing scanning according to an exemplary embodiment of the present invention.

Referring to FIG. 4, the terminal includes a duplexer 400, a receiver 410, a controller 420, a signal strength measuring unit 421, a scan controller 423, and a transmitter 430.

The duplexer 400 transmits a transmission signal provided from the transmitter 430 via an antenna, and provides a reception signal from the antenna to the receiver 410 according to a duplexing scheme.

The receiver 410 converts a Radio Frequency (RF) signal provided from the duplexer 400 into a baseband signal. For example, the receiver 410 includes an RF processor and a demodulator. The RF processor converts an RF signal provided from the duplexer 400 into a baseband signal. The demodulator demodulates and decodes a baseband signal provided from the RF processor.

The controller 420 controls an overall operation of the terminal.

The controller 420 controls to scan neighbor networks depending on a signal strength provided from the signal strength measuring unit 421. For example, when a signal strength from a serving station is less than a reference value, the controller 420 controls to scan neighbor networks in order to search for a network for roaming.

The terminal scans neighbor networks during a power save mode in order to reduce a packet loss caused by scanning of neighbor networks. Therefore, when determining to scan the neighbor networks, the controller 420 controls to switch to the power save mode.

The scan controller 423 divides all channels to be scanned into at least one channel set that can be scanned during a beacon period, and controls to scan the channels for each channel set. For example, in the case where the terminal cannot scan all the channels during the beacon period, the scan controller 423 divides all the channels to be scanned into at least one channel set that can be scanned during a beacon period. The scan controller 423 may divide a channel set such that the same channel as that of the serving station is scanned first, or divide a channel set according to a cell plan.

The signal strength measuring unit 421 measures an strength of a signal provided from the receiver 410.

The transmitter 430 converts data or a control signal to be transmitted to the serving station into an RF signal. For example, the transmitter 430 includes a modulator and an RF processor. The modulator encodes and modulates data or a control signal to be transmitted to the serving station. The RF processor converts an encoded and modulated signal provided from the modulator into an RF signal.

In the above-described construction, the controller 420 may perform functions of the signal strength measuring unit 421 and the scan controller 423. Separate configuration and illustration of the signal strength measuring unit 421 and the scan controller 423 in an exemplary embodiment of the present invention is for separately describing each function. Therefore, in actual realization, all or some of the functions of the signal strength measuring unit 421 and the scan controller 423 may be processed by the controller 420.

Hereinafter, a construction of a base station for controlling a power save mode of a terminal is described.

Figure 5:
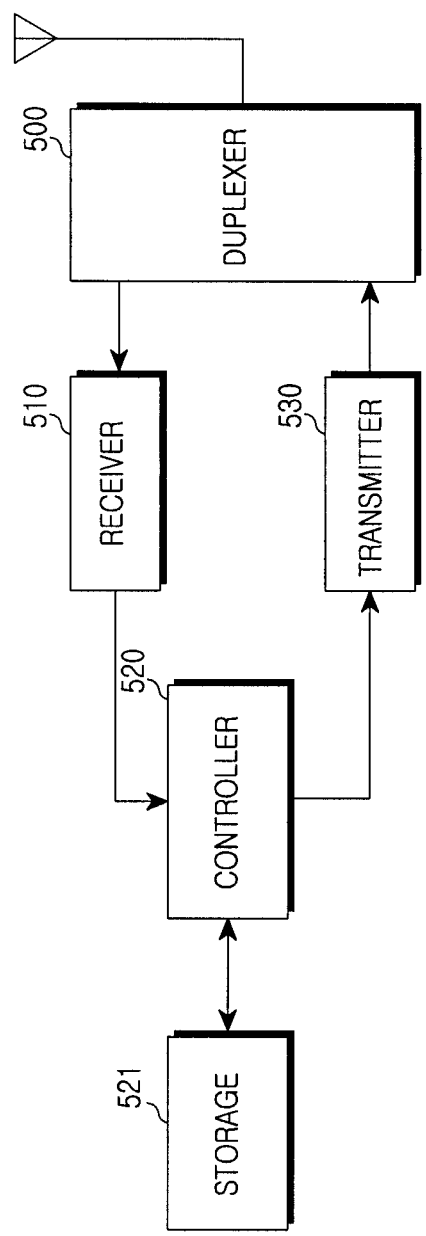
FIG. 5 is a block diagram illustrating a base station for controlling a power save mode of a terminal according to an exemplary embodiment of the present invention.

FIG. 5 is a block diagram illustrating a base station for controlling a power save mode of a terminal according to an exemplary embodiment of the present invention.

Referring to FIG. 5, the base station includes a duplexer 500, a receiver 510, a controller 520, a storage 521, and a transmitter 530.

The duplexer 500 transmits a transmission signal provided from the transmitter 530 via an antenna, and provides a reception signal from the antenna to the receiver 510 according to a duplexing scheme.

The receiver 510 converts a Radio Frequency (RF) signal provided from the duplexer 500 into a baseband signal. For example, the receiver 510 includes an RF processor and a demodulator. The RF processor converts an RF signal provided from the duplexer 500 into a baseband signal. The demodulator demodulates and decodes a baseband signal provided from the RF processor.

The controller 520 controls a power save mode switching of terminals located in a service area. For example, when a power save mode switch request signal is received from a terminal, the controller 520 sets power save mode management information for the terminal. Here, the power save mode management information includes a point at which the terminal switches to a power save mode, and period information at which a terminal that operates in the power save mode receives a beacon signal.

When data to be transmitted to the terminal that has switched to the power save mode exists according to the power save mode management information, the controller 520 controls to temporarily store the data in the storage 521.

The controller 520 controls to periodically inform the terminal of whether data to be transmitted to the terminal that operates in the power save mode exists. In addition, when a data request signal is received from the terminal, the controller 520 controls to transmit the data stored in the storage 521 to the terminal.

The storage 521 stores data to be transmitted to the terminal that operates in the power save mode under control of the controller 520.

The transmitter 530 converts data or a control signal to be transmitted to the terminal into an RF signal. For example, the transmitter 530 includes a modulator and an RF processor. The modulator encodes and modulates data or a control signal to be transmitted to the terminal. The RF processor converts a baseband signal provided from the modulator into an RF signal.

In the above exemplary embodiment, the base station transmits information as to whether data to be transmitted to the terminal that operates in the power save mode exists to the terminal using a beacon signal.

In an exemplary embodiment of the present invention, the base station may transmit information as to whether data to be transmitted to the terminal that operates in the power save mode exists to the terminal using a Delivery Traffic Indication Map (DTIM) signal. In this case, the base station transmits a DTIM signal every DTIM period.

As described above, since a terminal of a wireless communication system sequentially scans channel groups of channels of neighbor networks during a power save mode, a packet loss and QoS deterioration may be prevented.

The above-described methods according to the present invention can be realized in hardware or as software or computer code that can be stored in a recording medium such as a CD ROM, a RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for scanning neighbor networks in a mobile terminal, the method comprising:
   measuring strength of a signal received from a serving station;
   determining whether to scan at least one neighbor network with consideration of the strength of the signal;
   when determining to scan the at least one neighbor network, switching the mobile terminal to a power save mode; and
   scanning at least one channel of the at least one neighbor network during an operation of the power save mode,
   wherein the switching to the power save mode comprises:
   requesting the serving station to transmit power save mode management information; and
   when the power save mode management information is received from the serving station, switching to the power save mode, wherein the power save mode management information comprises at least one of point information at which the power save mode is switched and period information at which a signal is to be received.

2. The method of claim 1, wherein the scanning of the at least one channel comprises:
   determining at least one channel to be scanned from all channels for scanning; and
   scanning the determined at least one channel.

3. The method of claim 1, further comprising, prior to the scanning of the at least one channel, dividing all channels for scanning into one or more channel groups,
   wherein the channel group comprises at least one channel to be scanned during an period for receiving a signal during an operation of the power save mode, and the scanning comprises scanning at least one channel included in one of the one or more channel groups.

4. The method of claim 3, wherein the scanning of the at least one channel comprises sequentially scanning at least one channel included in each channel group according to an period for receiving a signal during an operation of the power save mode.

5. The method of claim 3, wherein the scanning of the at least one channel comprises scanning first a channel group comprising the same channel as that of the serving station among the one or more channel groups.

6. The method of claim 1, further comprising, after the scanning of the at least one channel:
   when a signal reception period arrives, determining whether data to be received from the serving station exists using a signal received from the serving station; and
   when the data to be received from the serving station exists, requesting the serving station to transmit the data.

7. The method of claim 6, further comprising:
   when the data to be received from the serving station does not exist, selecting a channel group to be scanned from the rest of channel groups that excludes the at least one channel group divided from all the channels to be scanned; and
   scanning a channel included in the selected channel group.

8. The method of claim 1, wherein determining whether to scan the at least one neighbor network comprises determining whether the strength of the signal received from the serving station is less than a predetermined value.

9. An apparatus for scanning neighbor networks in a mobile terminal, the apparatus comprising:
   a receiver for receiving a signal;
   a signal strength measuring unit for measuring strength of the signal received via the receiver; and
   a controller for:
   determining whether to scan at least one neighbor network with consideration of the strength of the signal,
   when determining to scan the at least one neighbor network, switching the mobile terminal to a power save mode, and
   controlling to scan at least one channel of the at least one neighbor network during the power save mode,
   wherein the controller controls the terminal to switch to the power save mode according to power save mode management information received from a serving station in response to a power save mode switch request, and wherein the controller controls to switch to the power save mode according to the power save mode management information comprising at least one of point information at which the power save mode is to be switched, and period information for receiving a signal during the power save mode.

10. The apparatus of claim 1, wherein the controller controls to select and scan at least one channel of all channels to be scanned.

11. The apparatus of claim 9, further comprising a scan controller for dividing all channels to be scanned into one or more channel groups prior to scanning at least one channel of the network,
wherein the controller controls to scan a channel included in one of the one or more channel groups divided by the scan controller, and the channel group comprises at least one channel to be scanned during an period for receiving a signal while the terminal operates in the power save mode.

12. The apparatus of claim 11, wherein the scan controller controls to sequentially scan one or more channels included in each channel group according to an period for receiving a signal while the terminal operates in the power save mode.

13. The apparatus of claim 11, wherein the scan controller controls to scan first a channel group comprising the same channel as that of the serving station among the one or more channel groups.

14. The apparatus of claim 9, wherein the controller scans at least one channel of the neighbor network, when a signal reception period arrives and a signal transmitted by the serving station is received via the receiver, determines whether data to be received from the serving station exists using the signal, and when the data to be received from the serving station exists, controls to request the serving station to transmit the data.

15. The apparatus of claim 14, wherein when the data to be received from the serving station does not exist, the controller controls to scan a channel included in a channel group to be scanned, selected from the rest of channel groups that excludes at least one channel group divided from all the channels to be scanned.

16. The apparatus of claim 9, wherein the controller determines whether the strength of the signal received from the serving station is less than a predetermined value.

* * * * *